(12) United States Patent
Roesler et al.

(10) Patent No.: US 6,169,140 B1
(45) Date of Patent: Jan. 2, 2001

(54) MOISTURE-CURABLE COMPOSITIONS CONTAINING POLYISOCYANATES AND POLYACRYLATES HAVING ALKOXYSILANE GROUPS

(75) Inventors: Richard R. Roesler, Wexford, PA (US); Myron W. Shaffer, New Cumberland, WV (US)

(73) Assignee: Bayer Corporation, Pittsburgh, PA (US)

( * ) Notice: Under 35 U.S.C. 154(b), the term of this patent shall be extended for 0 days.

(21) Appl. No.: 09/301,427

(22) Filed: Apr. 28, 1999

(51) Int. Cl.[7] ............... C08J 3/00; C08K 3/20; C08L 83/00; C08L 83/04; C08G 77/04
(52) U.S. Cl. ............... 524/588; 524/506; 524/507; 524/589; 524/838; 524/864; 525/100; 525/101; 525/102; 525/123; 525/127; 525/128; 525/455; 528/28
(58) Field of Search ................... 525/123, 455, 525/127, 128, 100, 101, 102; 524/506, 507, 588, 589, 838, 864; 528/28

(56) References Cited

U.S. PATENT DOCUMENTS 5,162,426  11/1992  Hazan et al. ............ 524/521
6,005,047 * 12/1999  Shaffer et al. ............ 524/590

* cited by examiner

Primary Examiner—Patrick D. Niland
(74) Attorney, Agent, or Firm—Joseph C. Gil; Thomas W. Roy

(57) ABSTRACT

The present invention relates to moisture-curable compositions containing a mixture of a) a polyisocyanate and
b) a polyacrylate resin which has an alkoxysilane group content (calculated as Si, MW 28) of 0.2 to 4.5% by weight, based on the weight of the polyacrylate resin, and contains less than 0.2% by weight of hydroxy groups, based on the weight of the polyacrylate resin, wherein components a) and b) are present in amounts sufficient to provide an equivalent ratio of isocyanate groups to alkoxy groups, which are bound to Si, of 1.0:0.05 to 1.0:2.5.

The present invention also relates to coatings, sealants and adhesives prepared from these compositions.

15 Claims, No Drawings

MOISTURE-CURABLE COMPOSITIONS CONTAINING POLYISOCYANATES AND POLYACRYLATES HAVING ALKOXYSILANE GROUPS

BACKGROUND OF THE INVENTION

1. Field of the Invention

The present invention relates to moisture-curable coating compositions containing polyisocyanates and polyacrylates having chemically incorporated alkoxysilane groups, and to coatings, sealants and adhesives prepared from these compositions.

2. Discussion of the Background

It is known that polyisocyanate resins are curable in the presence of atmospheric moisture to form polyurea coatings. During the curing mechanism an isocyanate group reacts with moisture to form an amino group, which then reacts with another isocyanate group to form a urea. One of the disadvantages of these moisture-curable resins is that the curing mechanism is relatively slow.

It is also known that resins containing alkoxysilane groups are curable in the presence of moisture by "silane polycondensation" during which the alkoxysilane groups are hydrolyzed to form Si—OH groups, which subsequently react to form siloxane groups (Si—O—Si).

A disadvantage of both of these moisture-curable resins is that their curing rates are relatively slow. Accordingly, it is an object of the present invention to increase the curing rate of these moisture-curable resins. This object may be achieved with the coating compositions of the present invention, which contain a mixture of polyisocyanates and polyacrylates that have been modified to contain alkoxysilane groups. The faster curing rates obtained according to the present invention are surprising because compounds containing alkoxysilane groups cure more slowly than polyisocyanates. However, when both isocyanate groups and alkoxysilane groups are present, a faster curing rate is obtained.

U.S. Pat. No. 5,162,426 and copending application, U.S. Ser. No. 09/172,750, disclose polyacrylates that have been modified to contain alkoxysilane groups. In U.S. Pat. No. 5,162,426 isocyanatoalkyl trialkoxysilanes are reacted with hydroxy-functional ethylenically unsaturated monomers and subsequently polymerized with other unsaturated monomers to form the silane-modified polyacrylates. In the copending application the alkoxysilane groups are incorporated by reacting polyacrylate polyols with compounds containing isocyanate, urea and alkoxysilane groups.

Copending applications, U.S. Ser. Nos. 09/172,751 and 09/172,584, describe compounds that contain both isocyanate groups and alkoxysilane groups and disclose that these compounds cure faster than compounds containing only one of these groups.

SUMMARY OF THE INVENTION

The present invention relates to moisture-curable compositions containing a mixture of
a) a polyisocyanate and
b) a polyacrylate resin which has an alkoxysilane group content (calculated as Si, MW 28) of 0.2 to 4.5% by weight, based on the weight of the polyacrylate resin, and contains less than 0.5% by weight of hydroxy groups, based on the weight of the polyacrylate resin,
wherein components a) and b) are present in amounts sufficient to provide an equivalent ratio of isocyanate groups to alkoxy groups, which are bound to Si, of 1.0:0.05 to 1.0:2.5.

The present invention also relates to coatings, sealants and adhesives prepared from these compositions.

DETAILED DESCRIPTION OF THE INVENTION

Suitable polyisocyanates for use as component a) according to the present invention include monomeric diisocyanates, polyisocyanate adducts and NCO prepolymers, preferably polyisocyanate adducts and NCO prepolymers and more preferably polyisocyanate adducts. The polyisocyanates have an average functionality of 1.5 to 6, preferably 1.8 to 6, more preferably 2 to 6 and most preferably 2 to 4.

Suitable monomeric diisocyanates may be represented by the formula

$$R(NCO)_2$$

wherein R represents an organic group obtained by removing the isocyanate groups from an organic diisocyanate having a molecular weight of from about 112 to 1,000, preferably from about 140 to 400. Preferred diisocyanates are those in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6 to 15 carbon atoms.

Examples of suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanato-cyclohexyl)-methane, 1,3- and 1,4-bis-(isocyanatomethyl)-cyclohexane, bis-(4-isocyanatocyclohexyl)-methane, 2,4'-diisocyanato-dicyclohexyl methane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenylmethane diisocyanate and 1,5-diisocyanato naphthalene and mixtures thereof.

Monomeric polyisocyanates containing 3 or more isocyanate groups such as 4-isocyanatomethyl-1,8-octamethylene diisocyanate and aromatic polyisocyanates such as 4,4',4"-triphenylmethane triisocyanate and polyphenyl polyethylene polyisocyanates obtained by phosgenating aniline/formaldehyde condensates may also be used.

Preferred organic diisocyanates include 1,6-hexamethylene diisocyanate, 1-isocyanato-3-isocyanatomethyl-3,5,5-trimethylcyclohexane (isophorone diisocyanate or IPDI), bis-(4-isocyanatocyclohexyl)-methane, 1-isocyanato-1-methyl-4(3)-isocyanatomethyl cyclohexane, 2,4- and/or 2,6-toluylene diisocyanate, and 2,4- and/or 4,4'-diphenyl-methane diisocyanate.

In accordance with the present invention the polyisocyanate component is preferably in the form of a polyisocyanate adduct. Suitable polyisocyanate adducts are those containing isocyanurate, uretdione, biuret, urethane, allophanate, iminooxadiazine dione, carbodiimide and/or oxadiazinetrione groups. The polyisocyanates adducts, which preferably have an NCO content of 5 to 30% by weight, include:

1) Isocyanurate group-containing polyisocyanates which may be prepared as set forth in DE-PS 2,616,416, EP-OS 3,765, EP-OS 10,589, EP-OS 47,452, U.S. Pat. No. 4,288,586 and U.S. Pat. No. 4,324,879. The isocyanato-isocyanurates generally have an average NCO functionality of 3 to 3.5 and an NCO content of 5 to 30%, preferably 10 to 25% and most preferably 15 to 25% by weight.
2) Uretdione diisocyanates which may be prepared by oligomerizing a portion of the isocyanate groups of a diisocyanate in the presence of a suitable catalyst, e.g., a trialkyl phosphine catalyst, and which may be used in admixture with other aliphatic and/or cycloaliphatic polyisocyanates, particularly the isocyanurate group-containing polyisocyanates set forth under (1) above.
3) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.
4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.
5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.
6) Isocyanurate and allophanate group-containing polyisocyanates which may be prepared in accordance with the processes set forth in U.S. Pat. Nos. 5,124,427, 5,208,334 and 5,235,018, the disclosures of which are herein incorporated by reference, preferably polyisocyanates containing these groups in a ratio of monoisocyanurate groups to mono-allophanate groups of about 10:1 to 1:10, preferably about 5:1 to 1:7.
7) Iminooxadiazine dione and optionally isocyanurate group-containing polyisocyanates which may be prepared in the presence of special fluorine-containing catalysts as described in DE-A 19611849. These polyisocyanates generally have an average NCO functionality of 3 to 3.5 and an NCO content of 5 to 30%, preferably 10 to 25% and most preferably 15 to 25% by weight.
8) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.
9) Polyisocyanates containing oxadiazinetrione groups and containing the reaction product of two moles of a diisocyanate and one mole of carbon dioxide.

Preferred polyisocyanate adducts are the polyisocyanates containing isocyanurate, uretdione, biuret, iminooxadiazine dione and/or allophanate groups.

The NCO prepolymers, which may also be used as the polyisocyanate component a) in accordance with the present invention, are prepared from the previously described monomeric polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 500 to about 10,000, preferably 800 to about 8,000, and more preferably 1800 to 8,000, and optionally low molecular weight compounds having molecular weights below 500. The molecular weights are number average molecular weights ($M_n$) and are determined by end group analysis (OH and/or NH number). Products obtained by reacting polyisocyanates exclusively with low molecular weight compounds are polyisocyanates adducts containing urethane groups and are not considered to be NCO prepolymers.

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred, especially the polyether polyols.

Examples of suitable high molecular weight polyhydroxyl compounds include polyester polyols prepared from low molecular weight alcohols and polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and/or acid anhydrides. Polylactones having hydroxyl groups, particularly poly-ε-caprolactone, are also suitable for producing the prepolymers.

Also suitable for preparing the prepolymers are polyether polyols, which may be obtained in known manner by the alkoxylation of suitable starter molecules. Examples of suitable starter molecules include polyols, water, organic polyamines having at least two N-H bonds and mixtures thereof. Suitable alkylene oxides for the alkoxylation reaction are preferably ethylene oxide and/or propylene oxide, which may be used in sequence or in admixture.

Other suitable polyols include polycarbonates having hydroxyl groups, which may be produced by the reaction of diols with phosgene or diaryl carbonates such as diphenyl carbonate.

Further details concerning the low molecular weight compounds and the starting materials and methods for preparing the high molecular weight polyhydroxy compounds are disclosed in U.S. Pat. No. 4,701,480, herein incorporated by reference.

Other examples include the known high molecular weight amine-functional compounds, which may be prepared by converting the terminal hydroxy groups of the polyols previously described to amino groups, and the high molecular weight polyaspartates and polyaldimines disclosed in U.S. Pat. Nos. 5,243,012 and 5,466,771, respectively, herein incorporated by reference.

These NCO prepolymers preferably have an isocyanate content of 0.3 to 35% by weight, more preferably 0.6 to 25% by weight and most preferably 1.2 to 20% by weight. The NCO prepolymers are produced by reacting the diisocyanates with the polyol component at a temperature of 40 to 120° C., preferably 50 to 100° C., at an NCO/OH equivalent ratio of 1.3:1 to 20:1, preferably 1.4:1 to 10:1. If chain extension via urethane groups is desired during the preparation of the isocyanate prepolymers, an NCO/OH equivalent ratio of 1.3:1 to 2:1 is selected. If chain extension is not desired, an excess of diisocyanate is preferably used, corresponding to an NCO/OH equivalent ratio of 4:1 to 20:1, preferably 5:1 to 10:1. The excess diisocyanate may optionally be removed by thin layer distillation when the reaction is completed. In accordance with the present invention NCO prepolymers also include NCO semi-prepolymers which contain unreacted starting polyisocyanates in addition to the urethane group-containing prepolymers.

Polyacrylates b) containing alkoxysilane groups have
a) an alkoxysilane group content (calculated as Si, MW 28) of 0.2 to 4.5% by weight, preferably 0.2 to 4% and more preferably 0.5 to 3.5%, and
b) contain less than 0.2% by weight, preferably less than 0.1% by weight and more preferably are substantially free from hydroxy groups.

The method of preparing polyacrylates b) is not critical, provided that they satisfy the preceding requirements. For example, a polyacrylate having hydroxy groups may be reacted with the compounds containing urea, isocyanate and alkoxysilane groups corresponding to formula I

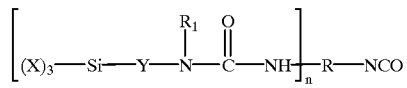

(I)

wherein

X represents identical or different organic groups which are inert to isocyanate groups below 100° C., provided that at least one of these groups is an alkoxy group, preferably alkyl or alkoxy groups having 1 to 4 carbon atoms and more preferably alkoxy groups, Y represents a linear or branched alkylene radical containing 1 to 8 carbon atoms, preferably a linear radical containing 2 to 4 carbon atoms or a branched radical containing 5 to 6 carbon atoms, more preferably a linear radical containing 3 carbon atoms, R represents the residue obtained by removing the isocyanate groups from a monomeric polyisocyanate or a polyisocyanate adduct containing n+1 isocyanate groups, preferably a monomeric polyisocyanate, more preferably a monomeric diisocyanate and most preferably a monomeric diisocyanate containing aliphatically and/or cycloaliphatically bound isocyanate groups, $R_1$ represents an organic group which is inert to isocyanate groups at a temperature of 100° C. or less, preferably an alkyl, cycloalkyl or aromatic group having 1 to 12, preferably 1 to 8 carbon atoms, or $R_1$ may also represent a group corresponding to formula II

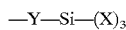 (II)

and n is an integer from 1 to 3, preferably 1 or 2 and more preferably 1.

Especially preferred are compounds in which X represents methoxy, ethoxy groups or propoxy groups, more preferably methoxy or ethoxy groups and most preferably methoxy groups.

Suitable compounds containing alkoxysilane groups and amino groups, which may be used to prepare the compounds of formula 1, are those corresponding to formula III wherein

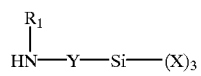

(III)

wherein X, Y, $R_1$ and n are as previously defined.

Examples of suitable aminoalkyl alkoxysilanes corresponding to formula III containing secondary amino groups include N-phenylaminopropyl-trimethoxysilane (available as A-9669 from OSI Specialties, Witco), bis-(γ-trimethoxysilylpropyl)amine (available as A-1170 from OSI Specialties, Witco), N-cyclohexylaminopropyl-triethoxysilane, N-methylaminopropyl-trimethoxysilane and the corresponding alkyl diethyoxy and alkyl dimethoxy silanes.

Especially preferred compounds containing isocyanate, urea and alkoxysilane groups are those corresponding to the formula IV

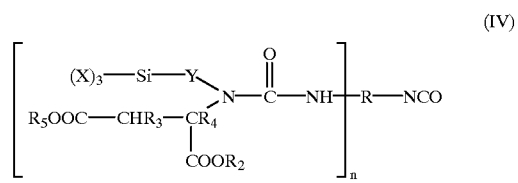

(IV)

wherein X, Y, R and n are previously defined and
$R_2$ and $R_5$ are identical or different and represent organic groups which are inert to isocyanate groups at a temperature of 100° C. or less, preferably alkyl groups having 1 to 9 carbon atoms, more preferably methyl, ethyl or butyl groups and
$R_3$ and $R_4$ are identical or different and represent hydrogen or organic groups which are inert to isocyanate groups at a temperature of 100° C. or less, preferably hydrogen.

The compounds of formula IV are prepared by reacting polyisocyanates with compounds corresponding to formula V

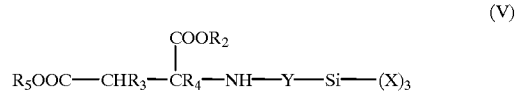

(V)

wherein X, Y, $R_2$, $R_3$, $R_4$, $R_5$ and n are as previously defined.

The compounds of formula V are prepared by reacting aminoalkyl alkoxysilanes corresponding to formula VI

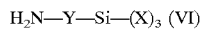 (VI)

wherein X and Y are as previously defined,
with maleic, fumaric or cinnamic acid esters corresponding to formula VII

 (VII).

Examples of suitable aminoalkyl alkoxysilanes of formula VI include 2-aminoethyl-dimethylmethoxy-silane; 6-aminohexyl-tributoxysilane; 3-aminopropyl-trimethoxysilane; 3-aminopropyl-triethoxysilane; 3-aminopropyl-methyldiethoxysilane; 5-aminopentyl-trimethoxysilane; 5-aminopentyl-triethoxysilane, 3-aminopropyl-triisopropoxysilane and 4-amino-3,3-dimethylbutyldimethoxymethylsilane. 4-amino-3,3-dimethylbutyldimethoxy-methylsilane is preferred and 3-aminopropyl-trimethoxysilane and 3-aminopropyl-triethoxysilane are especially preferred.

Examples of optionally substituted maleic or fumaric acid esters suitable for use in the preparation of the polyaspartates include dimethyl, diethyl, dibutyl (e.g., di-n-butyl), diamyl, di-2-ethylhexyl esters and mixed esters based on mixture of these and/or other alkyl groups of maleic acid and fumaric acid; and the corresponding maleic and fumaric acid esters substituted by methyl in the 2- and/or 3-position. The dimethyl, diethyl and dibutyl esters of maleic acid are preferred and the diethyl and dibutyl esters are especially preferred.

The reaction of primary amines with maleic or fumaric acid esters to form the aspartates of formula V is known and described, e.g., in U.S. Pat. No. 5,364,955, which is herein incorporated by reference.

Suitable polyisocyanates for preparing the compounds containing isocyanate and alkoxysilane groups corresponding to formulas I and IV are selected from the monomeric polyisocyanates and polyisocyanate adducts, which have previously been described for use as component a), provided that they have an average functionality of 2 to 4, preferably 2. Monomeric diisocyanates are preferably used.

The compounds containing isocyanate and alkoxysilane groups corresponding to formulas I and IV are prepared by reacting a polyisocyanate with an amino-functional alkoxysilane to form a compound containing one isocyanate group and one or more alkoxysilane groups. The reaction to form the urea groups is conducted at a temperature of 10 to 120° C., preferably 20 to 100° C. and more preferably 40 to 80° C.

To ensure that the products contain one isocyanate group, the number of equivalents of amino groups is one less than the number of equivalents of isocyanate groups. For example, one mole of triisocyanate is reacted with two moles of aminosilane and one mole of diisocyanate is reacted with one mole of aminosilane.

When diisocyanates are used as the starting material, it is possible to react an excess of the diisocyanate and to subsequently remove any unreacted diisocyanate by distillation in known manner. Even when one mole of diisocyanate is reacted with one mole of aminosilane, unreacted diisocyanate may be present; however, the unreacted diisocyanate may be removed by distillation.

In accordance with the present invention the special type of urea groups formed by the reaction of the amino-functional compounds containing alkoxysilane groups and aspartate groups (i.e., those corresponding to formula V) with the polyisocyanate component may be converted to hydantoin groups in known manner either by heating the compounds at elevated temperatures, optionally in the presence of a catalyst, or after storage under ambient conditions. Therefore, the term "urea groups" is also intended to include other compounds containing the group, N—CO—N, such as hydantoin groups.

If it is desired to convert the urea groups to hydantoin groups, it is preferred to form the hydantoin groups after the compounds containing isocyanate and alkoxysilane groups have been reacted with polyacrylate polyols to form polyacrylates b). This is because during the formation of the hydantoin groups, a monoalcohol is given off which can react with the isocyanate group of the compounds containing isocyanate, urea and alkoxysilane groups. This reaction prevents the isocyanate groups from being available for reaction with the high functionality polyols in the second stage of the two-stage process.

The monoalcohol can also react with polyisocyanate a). Therefore, if polyacrylates b) will be subjected to elevated temperatures or prolonged storage, the presence of these monoalcohols should be taken into consideration when determining the amount of crosslinking to be present in the final product.

It is also possible to react the polyacrylate having hydroxy groups with a compound containing isocyanate and alkoxysilane groups corresponding to formula VIII

OCN—Y—Si—(X)$_3$     (VIII)

wherein X and Y are as previously defined.

Suitable polyacrylate polyols for preparing the polyacrylates b) containing alkoxysilane groups have an average hydroxy functionality of at least 2, preferably 4 to 200 and more preferably 7 to 100, and an equivalent weight (determined by end group analysis) of at least 200, preferably 200 to 5000, more preferably 200 to 2500 and most preferably 200 to 1000.

The polyhydroxy polyacrylate may be prepared by known methods, such as those described in European Patent Office Publication 68,383, German Patentschrift 2,460,329, British Patent 1,515,868, U.S. Pat. No. 3,002,959, U.S. Pat. No. 3,375,227 or German Auslegeschrift 1,038,754. The polyhydroxy polyacrylates are generally prepared by the free radical polymerization or copolymerization of a hydroxyalkyl ester of an unsaturated carboxylic acid, preferably together with other hydroxyl-free unsaturated monomers.

Suitable hydroxylalkyl esters include esters containing 2 to 8, preferably 2 to 4 carbon atoms in the alkyl group and obtained from $\alpha,\beta$-unsaturated carboxylic acids having 3 to 5 carbon atoms, such as acrylic, methacrylic, fumaric, maleic, itaconic or crotonic acid, preferably acrylic and methacrylic acid esters. Hydroxyalkyl esters containing ether bridges in the alkyl groups may also be used but are less preferred. The preferred monomers having hydroxy groups include the 2-hydroxyethyl-, 2- and 3-hydroxypropyl-, and 2-, 3- and 4-hydroxybutyl-acrylates and -methacrylates.

The co-monomers that may be used for preparing the polyacrylate polyols include $\alpha,\beta$-olefinically unsaturated compounds, which have a molecular weight of 28 to 350 and are free from hydroxyl groups, such as ethylene, propylene, butene-1, hexene-1, octene-1, styrene, $\alpha$-methyl-styrene, divinyl benzene, various isomeric vinyl toluenes, esters of the $\alpha,\beta$-unsaturated carboxylic acids previously set forth with monohydric aliphatic alcohols having 1 to 18, preferably 1 to 10 carbon atoms, preferably the methyl, ethyl, N-butyl, N-pentyl, N-hexyl, 2-ethylhexyl or octadecyl esters of acrylic or methacrylic acid. Other suitable co-monomers include acrylic acid, methacrylic acid, vinyl acetate, acrylonitrile, methacrylonitrile and dienes, such as isoprene or butadiene.

Generally the polyhydroxy polyacrylates are obtained from 10 to 50 parts by weight of hydroxyalkyl esters of acrylic or methacrylic acid, 0 to 80 parts by weight of styrene and/or x-methylstyrene, 10 to 90 parts by weight of an acrylic and/or methacrylic acid ester free from hydroxyl groups and 0 to about 5 parts by weight of an $\alpha,\beta$-unsaturated mono- or dicarboxylic acid, preferably acrylic acid or methacrylic acid.

Polyacrylates b) containing alkoxysilane groups are obtained by reacting the polyacrylate polyols with the compounds containing one isocyanate group and one or more alkoxysilane groups corresponding to formulas I, IV and VIII at an NCO/OH equivalent ratio of 0.9:1.0 to 1.0:1.0, preferably 0.95:1.0 to 1.0:1.0 and more preferably 1.0:1.0. The amount of isocyanate groups must be sufficient to reduce percentage of hydroxy groups present in polyacrylate b) to the amounts previously set forth. The reaction to form the urethane groups is conducted at a temperature of 20 to 150° C., preferably 50 to 120° C. and more preferably 60 to 100° C.

In addition to the preceding embodiments in which alkoxysilane groups are incorporated after the preparation of the polyacrylate polyol, it is also possible to prepare the polyacrylates, at least in part, from unsaturated compounds having alkoxysilane groups.

For example, the compounds containing isocyanate and alkoxysilane groups corresponding to formulas I, IV and VIII can be reacted with unsaturated compounds containing hydroxy groups, e.g., hydroxyalkyl esters of (meth)acrylic acids, to form unsaturated compounds containing alkoxysilane groups.

Other unsaturated monomers containing alkoxysilane groups include those corresponding to formulas IX and X

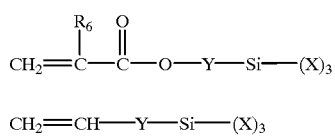

(IX)

CH$_2$=CH—Y—Si—(X)$_3$   (X)

wherein X and Y are as defined above and
R$_6$ represents hydrogen or alkyl, preferably hydrogen or methyl.

Examples of these compounds include acryloxypropyltrimethoxy silane, methacryloxypropyltrimethoxy silane, acryloxypropyltriethoxy silane, methacryloxypropyltriethoxy silane, methacryloxypropyltris(2-methoxyethoxy) silane, vinyltrimethoxy silane, vinyl triethoxy silane and vinyl tris(2-methoxyethoxy) silane.

The preceding unsaturated compounds can be polymerized to form polyacrylates b) containing alkoxysilane groups using the reaction procedures previously described for preparing the polyacrylate polyols.

The moisture-curable compositions are prepared by blending polyisocyanates a) with polyacrylates b) containing alkoxysilane groups in amounts sufficient to provide an equivalent ratio of isocyanate groups to alkoxy groups, which are bound to Si, 1.0:0.05 to 1.0:2.5, preferably 1.0:0.05 to 1.0:2.2 and more preferably 1.0:0.1 to 1.0:2.0.

Instead of using mixtures of polyisocyanates a) with polyacrylates b) containing alkoxysilane groups, it is also possible to use compounds containing both isocyanate groups and alkoxysilane groups, provided that they satisfy the preceding guidelines regarding the amounts of alkoxysilane groups and isocyanate groups. For example, compounds which contain both alkoxysilane groups and isocyanate groups may be present as a portion of the compositions according to the invention.

The compositions of the present invention are suitable for use in one-component, coating, adhesive or sealing compositions, which can be cured in the presence of atmospheric moisture. The compositions cure by a multi-cure mechanism, i.e.,
1) by the reaction of isocyanate groups with moisture,
2) by "silane polycondensation" from the hydrolysis of alkoxysilane groups to form Si—OH groups and their subsequent reaction with either Si—OH or Si—OR groups to form siloxane groups (Si—O—Si) and
3) conceivably by the reaction of isocyanate groups with Si—OH groups.

Suitable metallic, acidic or basis catalysts may be used to promote the curing reaction. Examples include acids such as paratoluene sulfonic acid; metallic salts such as dibutyl tin dilaurate; tertiary amines such as triethylamine or triethylene diamine; and mixtures of these catalysts. Low molecular weight, basic aminoalkyl trialkoxysilanes, such as those represented by formula IV, also accelerate hardening of the compounds according to the invention.

The moisture-curable compositions generally have a solids content of 30 to 80%, preferably 40 to 60%, based on the weight of the one-component composition. Suitable organic solvents are well known in the art.

The compositions may also contain known additives, such as leveling agents, wetting agents, flow control agents, antiskinning agents, antifoaming agents, fillers (such as silica, aluminum silicates and high-boiling waxes), viscosity regulators, plasticizers, pigments, dyes, UV absorbers and stabilizers against thermal and oxidative degradation.

The coating compositions may be applied to any desired substrates, such as wood, plastics, leather, paper, textiles, glass, ceramics, plaster, masonry, metals and concrete. They may be applied by standard methods, such as spray coating, spread coating, flood coating, casting, dip coating, roll coating. The coating compositions may be clear or pigmented.

The moisture-curable compositions may be cured at ambient temperature, or at elevated temperatures of 50 to 150° C., preferably 60 to 100° C. Preferably, the moisture-curable resins are cured at ambient temperatures.

The invention is further illustrated but is not intended to be limited by the following examples in which all parts and percentages are by weight unless otherwise specified.

EXAMPLES

Polyisocyanate 1

An isocyanurate group-containing polyisocyanate prepared from 1,6-hexamethylene diisocyanate and having an isocyanate content of 21.6%, a content of monomeric diisocyanate of <0.2% and a viscosity at 20° C. of 3000 mPa.s (available from Bayer Corporation as Desmodur N 3300).

Example 1

Preparation of Polyacrylate Containing Alkoxysilane Groups 407.5 parts (0.5 equiv.) of a hydroxy-functional styrene/acrylate copolymer at 70% solids in methoxypropyl acetate (G-Cure 105-70, available from Henkel) were combined with 286.5 parts of methoxypropyl acetate in a flask fitted with stirrer, nitrogen inlet, heating mantle and addition funnel and heated to 60° C. 123.5 parts (0.5 equiv.) of 3-isocyanatopropyltriethoxysilane (Silquest 1310, available from Witco) was added over a 10 minute period with no exotherm. The reaction mixture was heated for an additional 2 hours at 60° C. until the isocyanate content was zero. The viscosity of the 50% solids solution was 146 mPa.s at 250C.

Preparation of coatings

Polyisocyanate 1, the polyacrylate containing alkoxysilane groups and a catalyst were combined in the amounts set forth in the following table. All of the coating compositions had a solids content of 50%. Coatings were made with a three mil draw down bar and cured at 22° C. and 65% relative humidity. Dry times were determined with a Gardner Dry Time Meter as described in the Pacific Scientific Instruction Manuals DG-9600 and DG-9300. Pendulum hardness was determined in accordance with ASTM D-4366-87 (Koenig Pendulum Hardness).

| Ingredient | A Wt. solution | A Wt. solids | B Wt. solution | B Wt. solids | C Wt. solution | C Wt. solids | D Wt. solution | D Wt. solids | E Wt. solution | E Wt. solids |
|---|---|---|---|---|---|---|---|---|---|---|
| Polyisocyanate I | 10.0 | 10.0 | 7.5 | 7.5 | 5.0 | 5.0 | 2.5 | 2.5 | 0.0 | 0.0 |
| Silane functional acrylate solution | 0.0 | 0.0 | 5.0 | 2.5 | 10.0 | 5.0 | 15.0 | 7.5 | 20.0 | 10.0 |
| Dibutyltin acetoacetonate | 0.01 | 0.01 | 0.01 | 0.01 | 0.01 | 0.01 | 0.01 | 0.01 | 0.01 | 0.01 |
| Diazobicyclo-octane | 0.01 | 0.01 | 0.01 | 0.01 | 0.01 | 0.01 | 0.01 | 0.01 | 0.01 | 0.01 |
| Butyl acetate | 10.0 | 10.0 | 7.5 | 7.5 | 5.0 | 5.0 | 2.5 | 2.5 | 0.0 | 0.0 |
| Gardner Dry Time, min | | | | | | | | | | |
| Set to touch | 90 | | 45 | | 45 | | 30 | | 60 | |
| Dust dry | 150 | | 165 | | 55 | | 50 | | 230 | |
| Hard dry | >360 | | 180 | | 105 | | 90 | | >360 | |
| Pendulum hardness, sec | | | | | | | | | | |
| Day 1 | 14 | | 99 | | 31 | | 18 | | 0 | |
| Day 12 | 72 | | 159 | | 115 | | 156 | | 92 | |
| Day 21 | 154 | | 198 | | 164 | | 225 | | 133 | |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A moisture-curable composition containing a mixture comprising
    a) a polyisocyanate adduct containing isocyanurate, uretdione, biuret, iminooxadiazine dione and/or allophanate groups and
    b) a polyacrylate resin which has an alkoxysilane group content (calculated as Si, MW 28) of 0.2 to 4.5% by weight, based on the weight of the polyacrylate resin, and contains less than 0.2% by weight of hydroxy groups, based on the weight of the polyacrylate resin, and wherein the alkoxysilane groups are incorporated as the reaction product at an NCO/OH equivalent ratio of 0.9:1.0 to 1.0:1.0 of a polyacrylate polyol with a compound containing isocyanate and alkoxysilane groups and optionally urea groups, wherein components a) and b) are present in amounts sufficient to provide an equivalent ratio of isocyanate groups to alkoxy groups, which are bound to Si, of 1.0:0.05 to 1.0:2.5.

2. The moisture-curable composition of claim 1 wherein the alkoxysilane groups are incorporated as the reaction product at an NCO/OH equivalent ratio of 0.9:1.0 to 1.0:1.0 of
    i) a polyol having a functionality of at least 2 and an equivalent weight of at least 200 with
    ii) a compound containing isocyanate and alkoxysilane groups corresponding to formula VIII OCN—Y—Si—(X)$_3$ (VIII)

wherein
    X represents identical or different organic groups which are inert to isocyanate groups below 100° C., provided that at least one of these groups is an alkoxy group and
    Y represents a linear or branched alkylene radical containing 1 to 8 carbon atoms.

3. The moisture-curable composition of claim 1 wherein the alkoxysilane groups are incorporated as the reaction product at an NCO/OH equivalent ratio of 0.9:1.0 to 1.0:1.0 of
    i) a polyol having a functionality of at least 2 and an equivalent weight of at least 200 with
    ii) a compound containing urea, isocyanate and alkoxysilane groups corresponding to formula I

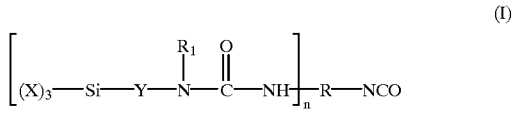

(I)

wherein
    X represents identical or different organic groups which are inert to isocyanate groups below 100° C., provided that at least one of these groups is an alkoxy group,
    Y represents a linear or branched alkylene radical containing 1 to 8 carbon atoms,
    R represents the residue obtained by removing the isocyanate groups from a monomeric polyisocyanate or a polyisocyanate adduct containing n+1 isocyanate groups,
    $R_1$ represents an organic group which is inert to isocyanate groups at a temperature of 100° C. or less and
    n is an integer from 1 to 3.

4. The moisture-curable composition of claim 3 wherein
    R represents the residue obtained by removing the isocyanate groups from a monomeric polyisocyanate having n+1 isocyanate groups and
    n is 1.

5. The moisture-curable composition of claim 2 wherein said polyol has a functionality of at least 4.

6. The moisture-curable composition of claim 4 wherein said polyol has a functionality of at least 4.

7. A coating, sealant or adhesive prepared from the moisture-curable composition of claim 1.

8. The moisture-curable composition of claim 3 wherein said compound containing urea, isocyanate and alkoxysilane groups corresponds to formula IV

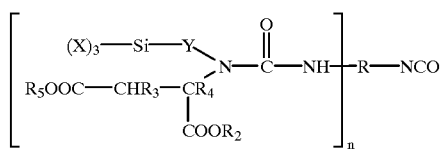

wherein
- $R_2$ and $R_5$ are identical or different and represent organic groups which are inert to isocyanate groups at a temperature of 100° C. or less, and
- $R_3$ and $R_4$ are identical or different and represent hydrogen or organic groups which are inert to isocyanate groups at a temperature of 100° C. or less.

9. The moisture-curable composition of claim 8 wherein R represents the residue obtained by removing the isocyanate groups from a monomeric polyisocyanate having n+1 isocyanate groups and n is 1.

10. The moisture-curable composition of claim 9 wherein said polyol has a functionality of at least 4.

11. A moisture-curable composition containing a mixture comprising
   a) a polyisocyanate and
   b) a polyacrylate resin which has an alkoxysilane group content (calculated as Si, MW 28) of 0.2 to 4.5% by weight, based on the weight of the polyacrylate resin, and contains less than 0.2% by weight of hydroxy groups, based on the weight of the polyacrylate resin, and wherein the alkoxysilane groups are incorporated as the reaction product at an NCO/OH equivalent ratio of 0.9:1.0 to 1.0:1.0 of
   i) a polyol having a functionality of at least 2 and an equivalent weight of at least 200 with
   ii) a compound containing isocyanate and alkoxysilane groups corresponding to formula VIII

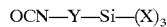

wherein
- X represents identical or different organic groups which are inert to isocyanate groups below 100° C., provided that at least one of these groups is an alkoxy group and
- Y represents a linear or branched alkylene radical containing 1 to 8 carbon atoms.

wherein components a) and b) are present in amounts sufficient to provide an equivalent ratio of isocyanate groups to alkoxy groups, which are bound to Si, of 1.0:0.05 to 1.0:2.5.

12. The moisture-curable composition of claim 11 wherein said polyol has a functionality of at least 4.

13. The moisture-curable composition of claim 11 wherein said polyisocyanate comprises a polyisocyanate adduct containing isocyanurate, uretdione, biuret, iminooxadiazine dione and/or allophanate groups.

14. The moisture-curable composition of claim 12 wherein said polyisocyanate comprises a polyisocyanate adduct containing isocyanurate, uretdione, biuret, iminooxadiazine dione and/or allophanate groups.

15. A coating, sealant or adhesive prepared from the moisture-curable composition of claim 11.

* * * * *